Patented Oct. 20, 1942

2,299,441

UNITED STATES PATENT OFFICE 2,299,441

CATALYTIC HALO-SUBSTITUTION OF SATURATED ORGANIC COMPOUNDS

William E. Vaughan and Frederick F. Rust, Berkeley, Calif., assignors to Shell Development Company, San Francisco, Calif., a corporation of Delaware No Drawing. Application September 2, 1939, Serial No. 293,256

10 Claims. (Cl. 260—662)

The present invention relates to the halogenation, via substitution, of saturated organic compounds, and more particularly pertains to a catalytic process for effecting the halogenation, via substitution, of saturated aliphatic and alicyclic hydrocarbons and of their partially halogenated derivatives.

The halogenation of saturated organic compounds, such as saturated aliphatic and alicyclic hydrocarbons, as well as partially halogenated derivatives thereof, is well known. These hydrocarbons react with the halogen, such as chlorine or bromine, to form products of halo-substitution, i. e., compounds in which one or more halogen atoms take the places of hydrogen atoms of the compound subjected to halogenation. The liberated hydrogen atoms combine with one half of the halogen employed in the reaction mixture to form a hydrogen halide, such as hydrogen chloride or hydrogen bromide. It is also known that such halo-substitution reactions between a halogen and a saturated organic compound of the class described may be effected by subjecting the mixture to elevated temperatures which favor the halo-substitution reaction, these temperatures, however, being below those at which substantial degradation and/or decomposition of the reactants and/or products of reaction occurs.

Generally, the halo-substitution reaction between the saturated aliphatic and/or alicyclic organic compounds and the halogen is effected by commingling the reactants, followed by a heating of the mixture to the desired reaction temperature. As an alternative, the saturated aliphatic or alicyclic organic compound to be halogenated, or the partially halogenated derivative thereof to be subjected to further halo-substitution, is heated and then commingled with a heated or unheated halogen, thereby effecting the desired reaction, or the heated halogen may be admixed with the unheated or less heated organic compound. Since the reaction is exothermic in character, it is unnecessary to preheat the reactant or reactants to the optimum reaction temperature. The desired or necessary temperature for effecting such substitution reactions will naturally vary with the nature of the saturated organic reactant, the character of halogen employed, the type of reactor, use of diluent, pressure, space velocity, etc. In general, it may be stated that the optimum temperatures for the halo-substitution of the above-outlined class of saturated organic compounds lies between about 225° C. and 700° C., the upper limit being controlled by the degradation of the reactants and/or products of reaction obtained.

The use of such elevated temperatures is frequently undesirable because of the relatively high cost of plant installation and of its operation and maintenance. Also, due to the mentioned exothermic character of the halo-substitution reactions, it is frequently difficult to control these high temperature reactions, with resultant decomposition of the reactants, formation of carbon, tar, etc. Furthermore, the aforementioned high temperature reactions necessitate the preheating of the reactants. Since halogen is highly reactive especially at the relatively high temperatures ordinarily employed for the halo-substitution of the saturated hydrocarbons of the class mentioned, it is often necessary to employ preheaters, mixers and/or reactors which are constructed of or lined with materials, such as hard carbon, Monel metal, Hastelloy, etc., which are substantially unattacked by such heated halogen. Obviously, this further increases the initial and operating costs of installations employed for the thermal halogenation of saturated aliphatic and/or alicyclic compounds, and/or of their partially halogenated saturated derivatives capable of further halogenation via substitution.

It is therefore the main object of the present invention to avoid the above and other defects, and to provide an improved process for the halogenation, via substitution, of saturated organic compounds, and particularly of saturated aliphatic and alicyclic hydrocarbons and of their partially halogenated derivatives. It is a further object to provide an improved process wherein saturated organic compounds of the class described may be effectively and economically reacted with a free halogen, or with a reactant which yields a free halogen under the operating conditions, at relatively lower temperatures which could not be employed heretofore for the production of products of halo-substitution. A still further object is to provide a process wherein the above-outlined saturated organic compounds may be effectively halogenated, via substitution, at temperatures below about 225° C., i. e., below the lower temperature limit at which said compounds could be previously thermally halogenated in the dark.

It has now been discovered that the above and other objects may be attained by effecting the halo-substitution reaction in the presence of certain catalysts having definite and specific characteristics. Generally speaking, these catalysts comprise compounds which are in the form of free radicals or which yield free radicals under the halogenating conditions.

The term "free radical," as employed herein, refers to an organic compound in which all of the valences are not satisfied (see: Hackh's Chemical Dictionary, 2nd ed., page 397). These free radicals are electrically neutral molecules possessing one unpaired electron and exhibiting an unsaturated behavior. These properties distinguish these free radicals from ions (such as those obtained by ionization of certain salts or in electric discharges in gases).

It has also been discovered that free radicals (whether preformed or produced and existing as such during the reaction) catalyze the reaction between halogens and the saturated organic compounds of the outlined class, so that the halo-substitution reaction may be effectively and efficiently realized at relatively low temperatures. Thus, as will be brought out more fully hereinbelow, by using a free radical (or organic compounds which yield free radicals under operating conditions or which exist in the form of free radicals under the operating conditions) as the catalyst, it is now possible to effect the reaction between a halogen and a saturated organic compound to produce high yields of products of halogenation, via substitution, even at temperatures at which no or substantially no halo-substitution could be realized if the reaction were to be attempted at such temperatures without the use of the catalyst. It was further discovered that the presence of the free radicals permits the effecting of the above halo-substitution reactions both in liquid and vapor phases and at temperatures effectively below the 200° C. or 225° C. which is usually the minimum temperature range for the non-catalytic, thermal halogenation, via substitution, of the outlined class of saturated aliphatic and alicyclic hydrocarbons, and of their partially halogenated derivatives.

Representative saturated organic compounds of the class which may be halo-substituted in accordance with the process of the invention are the saturated aliphatic hydrocarbons such as ethane, propane, n-butane, isobutane, n-pentane, the isopentanes, and the straight and branched chain hexanes, heptanes, octanes, nonanes and the like; the alicyclic hydrocarbons, as cyclopropane, cyclobutane, cyclopentane, cyclohexane, higher homologues thereof, methyl cyclopentane, methyl cyclohexane, and the like; the partially halosubstituted normal and branched-chain saturated aliphatic and alicyclic hydrocarbons, such as ethyl chloride, dichlorethane, 1-chloropropane, 2-chloropropane, 1,1-dichloropropane, 1,2-dichloropropane, 1,3-dichloropropane, monochlorobutane, dichlorobutane, 2,3-dibromobutane, monochlorcyclopentane, and the like and their homologues and analogues. The saturated aliphatic or alicyclic compound may be linked to one or more aromatic radicals. Thus, compounds which may be treated according to the present invention include phenyl alkyl hydrocarbons. Also, saturated aliphatic and/or alicyclic acids, ketones, alcohols, esters, etc., fall within the class of compounds which may be employed as the primary material.

As stated, all compounds which exist in the form of free radicals or which yield free radicals under the halogenating conditions, are suitable as halo-substitution promoting catalysts, these compounds having the characteristics of favoring or catalyzing the halo-substitution reaction and thus allowing the effective realization of the halogenation reaction at temperatures substantially lower than those heretofore necessary and/or desirable for the thermal, non-catalytic halogenation, via substitution, of the described class of saturated aliphatic and alicyclic organic compounds. In other words, these free radicals (whether existing as such when introduced into the reaction zone, or formed therein, for example, by thermal dissociation under the influence of the operating conditions in such reaction zone) effect the halogenation of the saturated organic compounds at temperatures below about 200° C. and even at room temperatures or below and in the liquid phase, such temperatures being ineffective or, at least, highly inefficient for the non-catalytic halo-substitution reaction.

Broadly, stated, the substances which are suitable as the catalysts for the halo-substitution reaction according to the process of the present invention comprise the organo-metallic compounds, azo-compounds, organic peroxides, and the organic free radical compounds. The first three groups of compounds comprise substances which yield free radicals under the operating conditions existing during the halo-substitution reaction, while the fourth group comprises compounds which exist as or readily dissociate into free radicals.

Representative compounds which exist in the form of free radicals are the substances containing trivalent carbon, as triarylmethyls of the type of triphenyl methyl, and trialkylmethyls of the type of triethyl methyl, compounds which contain bivalent and quadrivalent nitrogen, compounds containing univalent oxygen or sulfur, and the like. A more complete list of such organic free radical compounds is to be found in the 1938 edition of "Organic Chemistry—an Advanced Treatise," by H. Gilman and others, vol. I, pages 489–541.

As to the azo-compounds, reference is made to azo-methane which decomposes thermally, photo-chemically or catalytically to yield free radicals. Other compounds of this group include azo-benzene, diazomethane, azo-diisopropane, etc. Representative organic peroxides suitable as catalysts for promoting the halo-substitution reaction according to the present invention include benzoyl peroxide, lauroyl peroxide, and the like.

It was stated above that organo-metallic compounds are highly suitable for promoting the halo-substitution reaction in accordance with the process of the present invention. Without any intention of being limited by the compounds enumerated herein, it may be stated that representative compounds of this class or group include substances of the type of tetraethyl lead, tetramethyl lead, tetraphenyl lead, tetraethyl tin, dimethyl-diethyl tin, tetramethyl tin, trimethyl-ethyl tin, tetraethyl germanium, diphenyl germanium, di- and trivalent organo-tin compounds of both the aliphatic and aromatic series, as triphenyl tin and diethyl tin, organo-lead compounds containing di- and trivalent lead, and the like, their homologues and analogues. Although the above organo-metallic compounds cover substances in which a carbon atom of the organic radical is united directly to a metal atom of the fourth group of the periodic table, it is to be understood that organo-metallic compounds containing metals of other groups are also suitable catalysts. Thus, dimethyl cadmium, dipropyl cadmium, trimethyl lanthanum, trimethyl bismuth, triphenyl bismuth, tetraphenyl chromium hexaphenyl disilane, and similar compounds may be employed as the catalysts for the halogenation of the saturated organic compounds according to the process of the present invention. In fact, a description and discussion of organo-metallic compounds (suitable as such halo-substitution promoting agents) may be found at pages 406–498 of the above-mentioned Gilman's "Organic Chemistry—an Advanced Treatise."

The optimum temperatures to be employed for the halogenation, via substitution, according to the present invention will depend on a number of variables, such as the saturated aliphatic or alicyclic organic compound to be halogenated and the halogen employed, as well as on the specific organo-metallic or azo-compound, organic peroxide, or organic free radical employed as the catalyst. Thus, the temperature must be such that the organic peroxide, organo-metallic compound or the azo-compound is decomposed or cleaved to liberate the organic free radicals which catalyze the halo-substitution reaction. Since such temperatures will be different for the various catalysts falling within the class of compounds comprising the halogenation promoting agents of the present invention, it is impossible to specify definite optimum temperatures. However, it may be stated that, when an organo-metallic compound, an azo-compound or an organic peroxide is used as the catalyst, it is possible to effect the halogenation, via substitution, of the saturated aliphatic and/or alicyclic hydrocarbons, and of their partially halogenated derivatives, at temperatures substantially below those necessary for such halo-substitution when the reaction is attempted without the use of the catalyst. In fact, in some cases, as this will be described more fully in the examples, it is possible to effect such halo-substitution, not only in the vapor phase, but also in the liquid phase and at or about room temperatures. In this connection, it must be noted that some of the organo-metallic compounds and azo-compounds do not yield free radicals unless subjected to excessively high temperatures. Such compounds may, therefore, not be useful as halogenation promoting catalysts, since the high temperatures necessary for their cleavage will also initiate the halogenation reaction by activating the halogen and thus initiating the reaction chain mechanism. It is possible, however, that the halogen will react with such organo-metallic compounds to effect the cleavage thereof and the liberation of the free radicals under the operating conditions.

The invention is illustrated by the following examples which are presented herein for the purpose of showing the advantages derived from operating according to the process of the present invention and the results obtained thereby. It is understood, however, that these examples are merely illustrative of the invention and are not to be considered as limiting the invention in any sense.

*Example I*

Gaseous ethane was first conveyed through a bath of tetraethyl lead maintained at 0° C. This ethane thus saturated with tetraethyl lead was then conveyed at a rate of 100 c. c./min. together with 50 c. c./min. of chlorine and 150 c. c./min. of nitrogen through a reaction zone maintained at 132° C. The tetraethyl lead concentration was about 0.002 mol % based on the total gaseous mixture. The nitrogen was employed merely as a diluent to control and moderate the violence of the chlor-substitution reaction and to inhibit the formation of polychlorides. An analysis of the effluent gases indicated that 95% of the chlorine was consumed, the obtained reaction product consisting of 80 mol % of ethyl chloride and 20 mol % of higher chlorides predominating in 1,1-dichloroethane.

*Example II*

A mixture of ethane, chlorine and nitrogen, without any preliminary contact with tetraethyl lead, was conveyed through a reaction zone in the same ratio and at the same rate as in Example I. Although the mixture was brought to the same temperature of 132° C. as in above example, an analysis showed that there was no reaction between the ethane and the chlorine.

*Example III*

Ethane, chlorine and a diluent, such as nitrogen or carbon dioxide, were reacted at a temperature of about 290° C. and in the dark, without the addition of any catalyst of the type of tetraethyl lead. The diluted reactant mixture was conveyed through the reaction zone at a rate of 100 c. c./min. of ethane, 50 c. c./min. of chlorine, and 150 c. c./min. of diluent gas. Under these operating conditions about 95% of the chlorine reacted, the products of reaction having the following approximate composition:

Ethyl chloride—about 78 mol %
1,1-dichloroethane—about 17 mol %
1,2-dichloroethane—about 4 mol %
Higher polychlorides—less than 1 mol %

A comparison of the results described in the above three examples clearly shows the advantages obtained when an organo-metallic compound is employed as a catalyst to promote the halo-substitution of the saturated organic compounds of the described class, it being noted that very small percentages thereof are sufficient to catalyze the reaction. Thus, whereas no reaction occurs at 132° C. when the interaction is attempted without the use of the catalyst, a substantially complete reaction was effected with the small quantity (0.002 mol %) of tetraethyl lead which was picked up by the ethane when the latter was passed through the catalyst bath maintained at 0° C. In fact, in order to accomplish the same degree of reaction by thermal, non-catalytic halogenation, the temperature had to be raised to about 290° C.

*Example IV*

A mixture of propane and chlorine was diluted with a mixture of carbon dioxide and nitrogen, and conveyed through a reaction zone at a rate of 50 c. c./min. of chlorine, 100 c. c./min. of propane, 100 c. c./min. of carbon dioxide and 50 c. c./min. of nitrogen. No reaction occurred when the reactants were heated to a temperature of 136° to 140° C.

In another experiment, the carbon dioxide was first saturated with tetraethyl lead at 0° C. and was then commingled with propane, chlorine and nitrogen in the ratio employed above. The mixture thus formed, containing about 0.002 mol % of the catalyst, was then conveyed at a rate of 300 c. c./min. through the reaction zone wherein a temperature of 136° to 140° C. was maintained.

An analysis showed that more than 95% of the chlorine entered into reaction, the reaction product having the following composition:

| | Mol per cent |
|---|---|
| Isopropyl chloride | 33 |
| n-Propyl chloride | 43 |
| Dichloro-propanes | 24 |

Example V

A flow of gaseous carbon dioxide was conveyed at a rate of 15 c. c./min. through tetraethyl lead at 25° C. This stream thus saturated with the organo-metallic compound was then commingled with cyclopentane, chlorine and nitrogen in the ratio of 15 c. c./min. of $CO_2$, 100 c. c./min. of cyclopentane, 50 c. c./min. of chlorine and 135 c. c./min. of nitrogen. The vaporous mixture was then conveyed through a reaction tube in which the diluted reactants were heated to 155° C. An analysis showed that more than 95% of the chlorine reacted to form mainly cyclopentyl chloride. On the other hand, when the reaction of the above mixture was attempted at the same temperature and under the same conditions but in the absence of the tetraethyl lead catalyst, the effluent gases contained all of the chlorine in an unreacted form, thus showing that no reaction occurred.

Example VI

Chlorine was introduced at a rate of 50 c. c./min. into 100 c. c. of de-oxygenated normal pentane. Simultaneously a stream of n-pentane containing not more than 0.00003 mol/c. c. of triphenyl methyl was added to the normal pentane in the reactor at a rate of 1½ c. c./min. The reaction was effected at room temperature in the liquid phase in the absence of light and for a period of 22 minutes. All of the chlorine thus introduced was found to have reacted with the n-pentane. On the other hand, when the reaction was attempted in the absence of the organic free radicals, the solution at the end of the 22 minute period was yellow from the dissolved and unreacted chlorine. The effluent gases from both runs were conveyed during the last three minutes of each run through potassium iodide solutions. In the case of the gases leaving the reactor in which the triphenyl methyl catalyst was used, it was necessary to use only 0.6 c. c. of 0.1N thiosulphate solution to titrate the unreacted chlorine present in such effluent gases, while 48.4 c. c. of the same thiosulphate solution were required to titrate the unreacted chlorine in the effluent gases from the experiment in which no catalyst was used.

Example VII

Two reaction vessels were each filled with 175 c. c. of n-pentane and kept at a temperature of about 10° C. The interior of the vessels was maintained in the dark and devoid of oxygen. A gaseous stream consisting of chlorine diluted with carbon dioxide was then conveyed into each vessel at a rate of 50 c. c./min. of chlorine and 50 c. c./min. of the diluent. The gaseous stream introduced into one of the reaction vessels also contained about 0.002 mol per cent of tetraethyl lead. At the end of about 22 minutes, it was found that the chlorine introduced into the n-pentane together with the catalyst reacted substantially completely with the pentane, while the pentane in the other vessel was discolored by the unreacted chlorine. Also, an analysis of the effluent gases from the two vessels indicated that there was about 26 times more chloro-substitution in the vessel receiving the catalyst as compared with the amount of chloro-substitution in the other reaction vessel.

Tests made on the catalyzing effect of azo-compounds on the halo-substitution of the described class of saturated organic compounds also showed the advantages of using such catalysts. Thus, the use of small quantities of azomethane at temperatures below 200° C. effected a reaction between n-butane and chlorine, whereas, in the absence of this catalyst, there was no reaction.

The above examples bring out the advantages derived from effecting the halo-substitution reaction according to the present process. Thus, the introduction of even very small quantities of free radicals or of organo-metallic compounds or azo-compounds, which yield free radicals under the halogenating conditions, permits the realization of the halo-substitution of saturated aliphatic or alicyclic organic compounds both in the liquid and vapor phases in the absence of actinic radiation, and at temperatures at which no, or substantially no, halo-substitution occurs when a catalyst is not employed. As stated, very small quantities of catalyst are sufficient to effect substantially complete halo-substitution. Thus, the examples show that excellent results were obtained when the catalyst concentration was as low as 0.002 mol % based on the total quantity of the diluted reactants employed. Generally, it is possible to effect the reaction with quantities of the above catalyst ranging from very small percentages of the order of about 0.001 mol % to about 0.005 mol %. However, still lower and higher percentages may be found advantageous under certain conditions of operation.

The carbon dioxide and the nitrogen were employed in the above examples merely for the purpose of diluting the hydrocarbon-chlorine mixture. Such dilution facilitates the control of the reaction since it prevents or decreases excessive decomposition, flashing of the mixture, and tar and carbon formation. Obviously, the use of such diluent may be dispensed with, or other inert diluents, such as helium, employed in connection with, or in lieu of, the above diluents.

Although the invention has been described with particular reference to the chlorination of saturated aliphatic and alicyclic hydrocarbons, it is to be understood that other saturated organic compounds and their partially halogenated derivatives may be halogenated, i. e., subjected to chlorination, bromination and/or iodination, via substitution, in accordance with the process of this invention. Also, instead of employing a free halogen per se, any of the known free halogen yielding substances, which are capable of liberating a free halogen under the conditions existing in the reaction system, may also be used. As such, reference is made to sulfuryl chloride, nitrosyl chloride, etc.

It will be further evident to those skilled in the art that the invention may be executed in a batch, intermittent or continuous manner. Generally, it is preferable to employ an amount of halogen not in excess of that theoretically required to react with all of the saturated aliphatic and/or alicyclic organic compound to be halogenated. The presence of an excess of halogen is usually avoided since such excesses are conducive to the formation of undesirable highly halogenated products, while an excess of the halogenatable compound is often desirable.

The reaction may be effected at any suitable pressure. Generally, the halo-substitution reaction according to the present invention may be effected at atmospheric pressures. However, somewhat higher or lower pressures may also be employed.

As pointed out, the presence of the free radicals or organic compounds yielding them, allows the realization of the halo-substitution reaction at substantially lower temperatures than those which are necessary for effecting a substantial halo-substitution by a thermal, non-catalytic halogenation. Also, the use of the small percentages of the catalyst described herein increases the rate of halo-substitution, so that, under identical operating conditions, the halo-substitution in the presence of the organic free radicals requirs a relatively shorter period of residence time as compared to a thermal, non-catalytic halo-substitution reaction. Therefore, the present process allows greater space velocities to effect the same conversion of the saturated organic compounds into their halo-substituted derivatives thus increasing the effective capacity of any given reaction chamber.

We claim as our invention:

1. A process of halogenating a saturated aliphatic hydrocarbon which comprises reacting said hydrocarbon with a halogen selected from the group consisting of chlorine, bromine and iodine, in the vapor phase and at a temperature of below 200° C., in the presence of small quantities of a metallo-hydrocarbon compound which yields halogenation promoting free hydrocarbon radicals under the operating conditions.

2. The process according to claim 1, wherein tetraethyl lead is employed as the free radical yielding metallo-hydrocarbon compound.

3. The process according to claim 1, wherein tetraethyl lead is employed as the free radical yielding metallo-hydrocarbon compound, and wherein the concentration of said tetraethyl lead is up to 0.005 mol per cent as calculated on the basis of the gaseous mixture subjected to the halogenation reaction.

4. A process of halogenating a saturated organic compound which comprises reacting said compound with a halogen selected from the group consisting of chlorine, bromine and iodine, at a temperature of below 200° C. and in the presence of a metallo-hydrocarbon compound which yields halogenation promoting free radicals under the operating conditions.

5. A process for the halogenation of a saturated alicyclic hydrocarbon which comprises reacting said hydrocarbon with a halogen selected from the group consisting of chlorine, bromine and iodine, in the presence of a metallo-hydrocarbon compound which yields free radicals under the operating conditions.

6. A process for the halogenation of saturated hydrocarbons, which comprises commingling the hydrocarbon to be treated with a halogen selected from the group consisting of chlorine, bromine and iodine, and effecting the reaction in the absence of actinic radiation and in the presence of a halogenation promoting catalyst comprising a metallo-hydrocarbon compound yielding free radicals under the operating conditions.

7. A process of halogenating a saturated aliphatic hydrocarbon which comprises reacting said hydrocarbon with a halogen selected from the group consisting of chlorine, bromine and iodine, at a temperature of below 200° C., and in the presence of tetraethyl lead employed in an amount less than 0.005 mol per cent as calculated on the basis of the mixture subjected to the halogenation reaction.

8. The process according to claim 7, wherein chlorine is employed as the halogenating agent.

9. A process of halagenating a saturated organic compound which comprises reacting said compound with a halogen selected from the group consisting of chlorine, bromine and iodine, at a temperature below that at which non-catalytic halogenation normally occurs to any appreciable extent, and in the presence of a metallo-hydrocarbon compound which yields halogenation promoting free radicals under the operating conditions.

10. A process of halogenating a saturated organic compound which comprises reacting said compound with a halogen selected from the group consisting of chlorine, bromine and iodine, in the presence of a metallo-hydrocarbon compound which yields free radicals under the operating conditions.

WILLIAM E. VAUGHAN.
FREDERICK F. RUST.